United States Patent

Dedoes

[15] 3,650,332
[45] Mar. 21, 1972

[54] SOIL CORING APPARATUS ASSEMBLY

[72] Inventor: Arnold A. Dedoes, 2070 W. Eleven Mile Road, Berkley, Mich. 48072

[22] Filed: Feb. 3, 1969

[21] Appl. No.: 795,853

[52] U.S. Cl. .............................. 172/22, 172/96, 172/545, 172/572, 172/678
[51] Int. Cl. .................................................. A01b 45/02
[58] Field of Search ............... 172/21, 22, 540, 545, 554, 172/122, 96, 117, 557, 572, 573, 678

[56] References Cited

UNITED STATES PATENTS

| | | | |
|---|---|---|---|
| 353,952 | 12/1886 | Lake | 172/554 X |
| 2,062,232 | 11/1936 | Pogue | 172/122 X |
| 2,975,735 | 3/1961 | Purvance | 172/21 X |
| 3,138,823 | 6/1964 | Langner | 172/21 UX |
| 3,221,822 | 12/1965 | Dedoes | 172/22 |
| 3,316,979 | 5/1967 | Dedoes | 172/22 |
| 1,992,116 | 2/1935 | Bornman | 172/572 X |
| 2,070,425 | 2/1937 | Engel | 172/573 X |
| 2,447,354 | 8/1948 | Morrill | 172/573 X |
| 2,700,926 | 2/1955 | Goit | 172/573 X |
| 3,485,511 | 12/1969 | Gale | 172/7 X |

*Primary Examiner*—Clyde I. Coughenour
*Attorney*—Hauke, Gifford & Patalidis

[57] ABSTRACT

This invention relates to soil penetrating implements of the kind for removing soil plugs of earth for the purpose of aerating, watering and fertilizing the soil or for any other agricultural purpose of treating the subsurface, and the particular improvement resides in the manufacture assembly, repair and operation of the several parts of the implement in a more efficient manner. The features are accomplished by, clamping the flexible steel ground engaging rim with its coring elements around separate spaced apart parallel wheel supports which are loosely mounted on a shaft journaled in a frame which may be coupled to a tractor and raised or lowered by the tractor hydraulic mechanism.

5 Claims, 7 Drawing Figures

Patented March 21, 1972
3,650,332
2 Sheets-Sheet 1
FIG. I
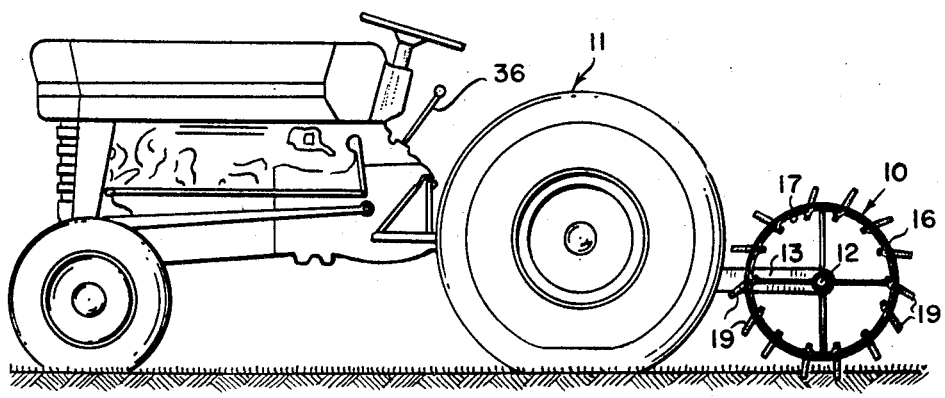
FIG. 2
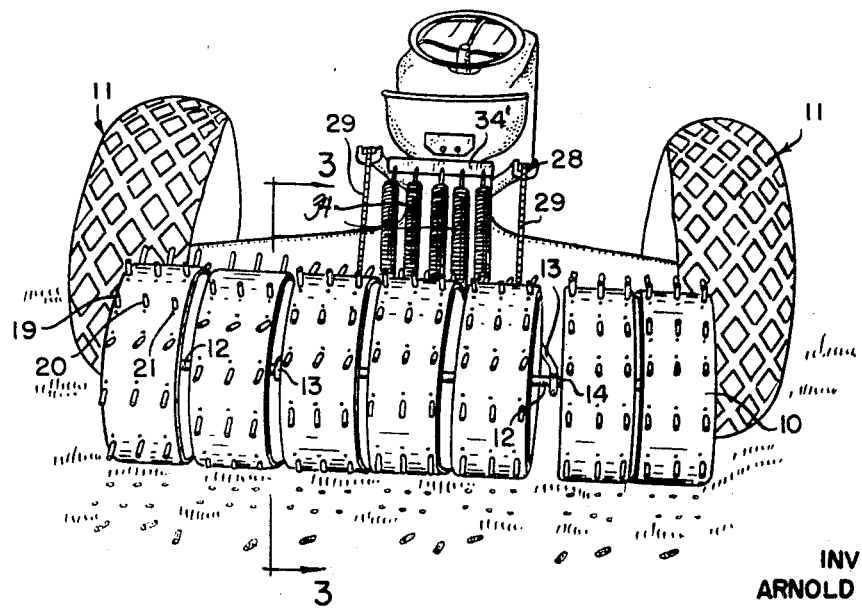
INVENTOR
ARNOLD A. DEDOES
BY Charles M. Funkhouser
ATTORNEYS Patented March 21, 1972 3,650,332
2 Sheets-Sheet 2
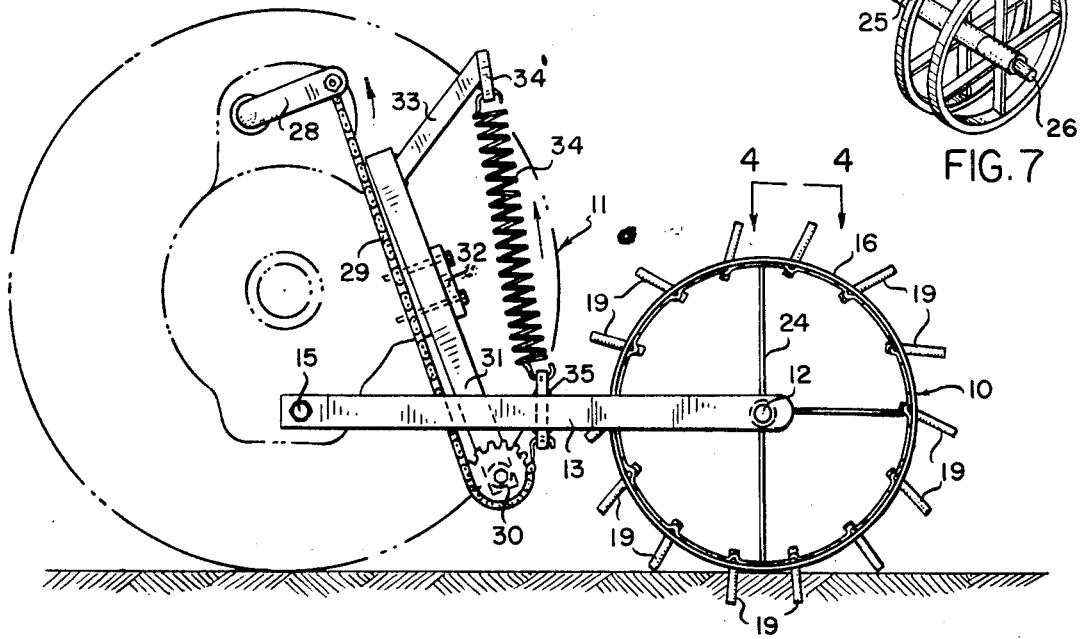
FIG. 3
FIG. 7
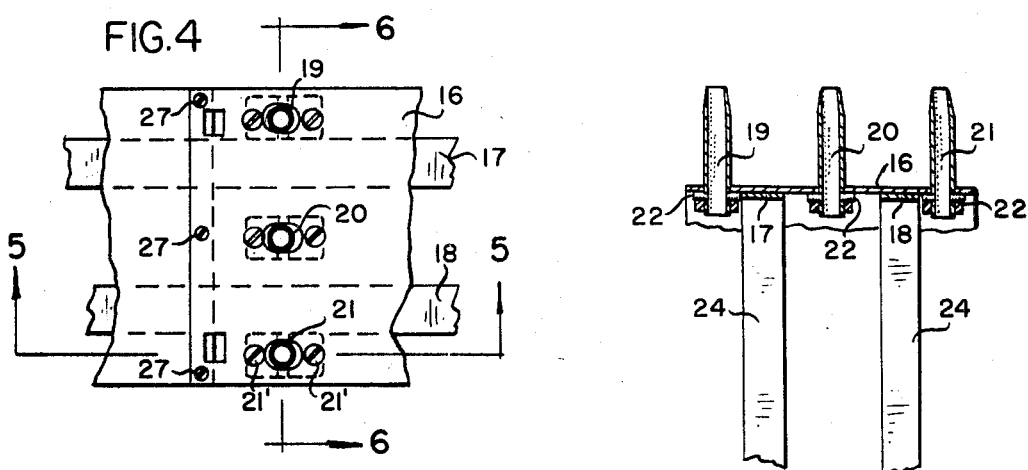
FIG. 4
FIG. 6
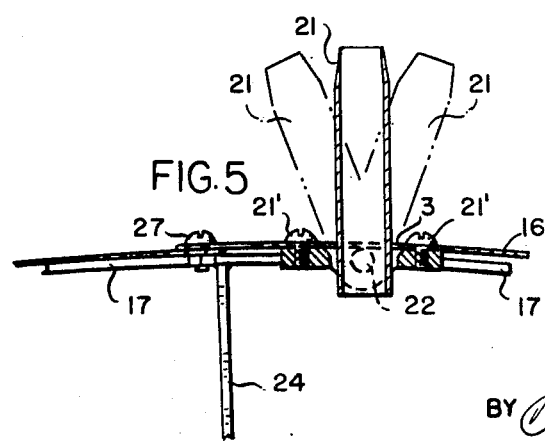
FIG. 5
INVENTOR
ARNOLD A. DEDOES
BY Charles M. Funkhouser
ATTORNEYS

SOIL CORING APPARATUS ASSEMBLY

This invention relates to soil coring implements and more particular to apparatus for treating sodded areas such as lawns, golf courses and the like where it is necessary to treat the subsoil without breaking up or destroying the present surface.

The apparatus generally is of the type forming the subject matter of my prior U.S. Pat. Nos. 3,221,822 and 3,316,979. The present application is directed to improvements in the utility, operation and assembly manufacture of such soil coring devices.

One important object of the present invention is to provide a rotary soil coring implement which shall be operable to provide a novel soil working implement as a unit which shall be of a simple and durable construction and more readily assembled and disassembled so that the individual parts may be repaired or replaced than similar apparatus now on the market.

Another object of the invention is to provide a simplified unit assembly of soil coring elements pivotally mounted on a flexible steel band wrapped around and clamped into rigid position on a pair of spaced apart wheel support rims.

Another object of the invention is to provide an assembly unit having a minimum number of parts and reduce the manufacturing cost to a minimum.

Another object of the invention is to provide a plurality of individual units freely assembled on a supporting shaft.

A further object of the invention is to provide a novel hydraulic connection under control of the draft vehicle operator for controlling the pressure of the soil coring elements on the soil and lifting the coring elements clear of the ground when moving from place to place or for transportation.

These and other objects of the invention will be more manifest from the following specification and drawings and more particularly set forth in the claims.

In the drawings:

FIG. 1 is a side elevation view of the soil engaging implement and a tractor.

FIG. 2 is a rear view in elevation of a multiple assembly of the units shown in FIG. 1.

FIG. 3 is a sectional view in elevation on line 3—3 of FIG. 2.

FIG. 4 is a plan fragmentary view of the union of the ends of the flexible steel rim parts and the laterally spaced coring elements.

FIG. 5 is a fragmentary sectional view of the assembly parts on line 4—4 of FIG. 3.

FIG. 6 is a fragmentary sectional view on line 6—6 of FIG. 4, and

FIG. 7 is a perspective view of a two wheel base unit for the coring implement rim.

Referring to FIGS. 1 and 2 of the drawings there is shown a soil coring implement 10 coupled to a conventional farm tractor device 11. A plurality of coring units are mounted for independent rotation on support shaft 12 which is journaled to a frame 13 and bearings indicated by the numeral 14.

The frame 13 is swingably connected to the tractor chassis 11 in any suitable manner as indicated by a pivot bolt 15. This frame 13 is designed to be operated by the tractor operator and may be raised clear of the ground for transportation or moved downwardly to force the coring elements into the ground if necessary as hereinafter more fully described.

The soil coring element 10 comprises essentially that described in my prior U.S. Pat. Nos. 3,221,822 and 3,316,979 but in the instant construction the entire implement is an assembled unit made of individual parts so that each part may be repaired or replaced without the use of special tools and at a minimum of expense or difficulty. This feature is accomplished by providing two individual wheel like supports spaced apart on the axle shaft 12 so that each wheel part indicated by the numerals 17 and 18 includes a rim hub and spokes and may be disassembled for any replacement or repair. In the present construction the wheels 17–18 are formed separately and may be of die cast metal as shown in FIGS. 4 and 7. Each wheel is of simplified construction consisting of a flat rim, four spokes and a hub all integrally formed as one casting. The flexible spring steel rim 16 with its individual coring elements is assembled by wrapping it around the rim surfaces of the wheels 17 and 18 so that it can be temporarily clamped and secured thereto into binding contact position. The meeting ends of the rim 16 are then held permanently in place on the wheels 17–18 by suitable connecting means such as screws 27–27 as shown in FIGS. 4 and 5 and may be readily released when disassembling the implement.

The steel rim 16 is of sufficient width to include at least three coring elements arranged transversely of the rim and these coring elements are also arranged in spaced relation circumferentially of the rim to which they may be attached as shown in FIG. 1, singly or in multiples as required for the best performance of the implement. Each of the coring elements is indicated by the numerals 19, 20 and 21 freely pivoted in suitable bearings 22 attached to the rim in any suitable manner as by screws 21–21 and projects through an elongated opening 3 formed in the rim as shown in FIG. 5 and more fully described in my U.S. Pat. No. 3,316,979.

The wheels 17 and 18 are held in spaced apart relation relative to the rim 16 and also on the axle shaft 12 by the core supported bearings as shown in FIG. 6 or the wheel hubs 25–25 as shown in FIG. 7.

In case of any damage to the coring elements or other parts of the unit, the entire unit may be readily dismantled and only the damaged parts replaced by an inexperienced mechanic with ordinary tools at a minimum of expense and loss of time in the overall operation of the repair job.

The steps of assembly may be briefly stated as follows: Place the support wheel rims 17–18 on a guide shaft if desired, wrap the flexible rim 16 with the soil coring elements 19 assembled thereon and then temporarily clamp the meeting ends thereof in overlapping relation so that they may be fixed to the wheel and the clamp removed. The unit is now ready to be slipped on an appropriate shaft 26 supported in the frame bearings 14–14.

The soil penetrating unit is arranged to be hitched to and operated by an ordinary hydraulically operated farm tractor with a minimum amount of change so that it may readily be raised for ordinary highway travel or lowered into soil engaging position or forced into the ground by the power hydraulic system usually present on such tractors. By way of illustration, the frame 13 is pivotally connected to the tractor chassis at 15 and raised or lowered by a rotatable arm 28 connected to a conventional hydraulic power system not shown. This arm 28 extremity is connected to one end of a chain 29 run around a sprocket pulley 30 mounted at the lower extremity of a member 31 fixally mounted on the tractor chassis as indicated by the numeral 32. The upper end of member 31 carries a bracket member 33 carrying a cross header member 34' to which are attached a plurality of tension springs 34–34 for lifting the frame 13 and associated implements whenever necessary for any reason. The lower end of the springs 34–34 are connected to the frame 13 and the chain 29 by a fixed connection link indicated by the numeral 35.

The operative control of these parts to raise or force the soil working elements downwardly into the ground may be under the control of the tractor operator by a single lever indicated by the numeral 36.

While I have shown the several parts freely assembled to form an efficient soil working implement, it it obvious that various changes may be made in the structure of the individual parts without departing from my invention as defined in the following claims; for example, it may be found expedient to replace the chain 29 with an ordinary flexible wire cable and the lifting springs 34 with an ordinary cantilever leaf spring extending transversely of the frame parts 13.

What I claim is:

1. A soil penetrating and coring implement adapted to be connected to and pulled over the ground surface by a tractor and including means connecting said tractor and said implement for transferring a portion of the weight of the tractor to the implement, said implement comprising, an axle and a frame connecting said axle to the rear of said tractor, a cylindrical member rotatably mounted on said axle and freely rotatable with respect thereto whereby as said tractor is moved said cylindrical member rolls along the ground surface behind said tractor, a plurality of hollow soil coring elements mounted to said cylindrical member whereby as a portion of the weight of said tractor is transferred to said cylindrical member and said cylindrical member is pulled along the ground surface by the tractor said coring elements penetrate the ground surface and remove a plug of soil therefrom, said weight transferring means comprising hydraulic means connected with said tractor and having an arm rotatable about an axis between an up position and a down position, said hydraulic means being operable when actuated to move said arm from said down position to said up position and means connected between said arm and said implement and translating upward force on said arm to a downward force on said implement.

2. The combination as defined in claim 1 and in which said cylindrical member comprises a pair of spaced apart wheels freely rotatable on said axle, a flexible spring steel band rim clamped to the periphery of both of said wheels to hold them in spaced relation, a plurality of spaced apart elongated openings formed in the surface of said rim and said core elements pivotally mounted in said openings.

3. The implement as defined in claim 1 and in which said connecting means comprises a chain connecting said arm to the underside of said frame and a sprocket engaging said chain intermediate said arm and said frame.

4. The combination as defined in claim 3 and including spring means for urging said frame upwardly.

5. Apparatus of the character described in claim 1 including means for positively preventing lateral movement of said elements relative to said elongated opening in said steel rim.

* * * * *

DEI-100-

UNITED STATES PATENT OFFICE
CERTIFICATE OF CORRECTION

Patent No. 3,650,332      Dated March 21, 1972

Inventor(s) Arnold A. Dedoes

It is certified that error appears in the above-identified patent and that said Letters Patent are hereby corrected as shown below:

Column 1, line 5, after "destroying the" delete
--present--

Column 1, line 13, after "which" delete "shall be"
and insert --is--

Column 1, line 14, after "which" delete "shall be"
and insert --is--

Column 1, line 23, before "reduce" insert --to--

Column 2, line 16, after the numeral "21" insert --and is--

IN THE CLAIMS

Cancel Claim 5.

On the cover sheet "5 Claims" should read -- 4 Claims --.

Signed and sealed this 15th day of August 1972.

(SEAL)
Attest:

EDWARD M. FLETCHER, JR.      ROBERT GOTTSCHALK
Attesting Officer      Commissioner of Patents